Inventors
Pierre Marzin
René Sueur
By their attorneys

Howson and Howson

April 24, 1951 P. MARZIN ET AL 2,550,198

COAXIAL CABLE CARRIER SYSTEM

Filed Oct. 7, 1947 2 Sheets-Sheet 2

Inventors
Pierre Marzin
René Sueur
By their attorneys
Howson and Howson

Patented Apr. 24, 1951 2,550,198

UNITED STATES PATENT OFFICE 2,550,198

COAXIAL-CABLE CARRIER SYSTEM

Pierre Marzin and René Sueur, Paris, France

Application October 7, 1947, Serial No. 778,444
In France October 10, 1944

Section 1, Public Law 690, August 8, 1946
Patent expires October 10, 1964

8 Claims. (Cl. 179—15)

Figure 1:
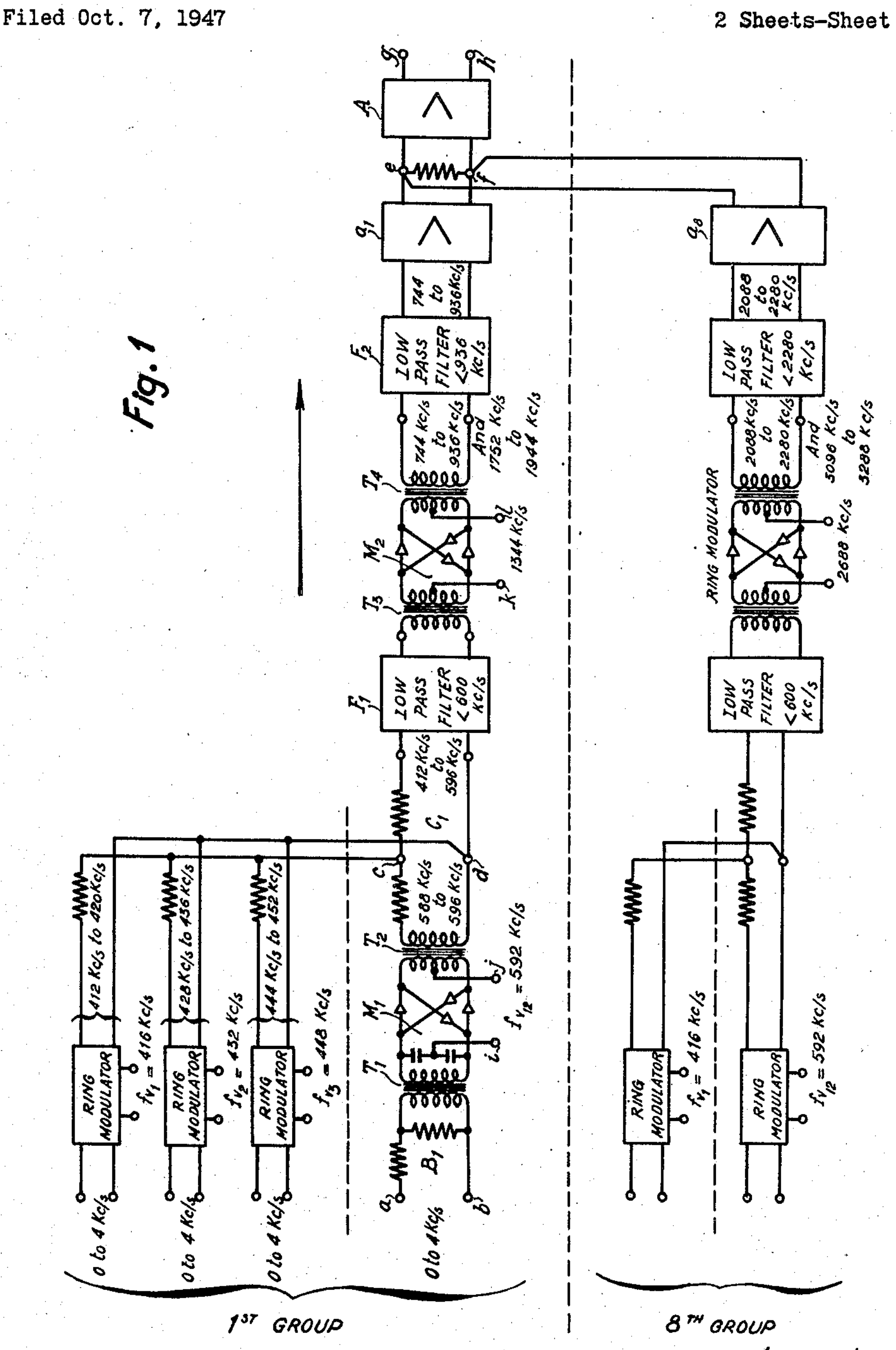

This invention relates to multiplex transmission systems and particularly to an inexpensive short haul carrier system for use with cables.

Several types of multiplex carrier systems are in use today which provides not only high transmission quality but also savings in the cost per transmission channel over the cost for a number of wire lines sufficient to handle the same number of speech or other low frequency transmissions. However, the cost of wire lines increases mainly with the length of such lines being very small for short distances whereas the cost of prior art types of carrier equipment is high, even though the distance between terminals is short. Accordingly, it has been the practice to employ wire lines for connecting terminals which are close together and to employ multiplex carrier transmission for relatively long distances, in which cases, the cost of the lines would exceed the cost of the carrier equipment. As a practical matter, it has been found economical to use prior art types of carrier systems mainly when the distance between terminals is 100 kilometers or more.

In the multiplex carrier systems of the prior art, one object has been to utilize the frequency spectrum as efficiency as possible by using expensive and complex filters and by using single side band transmission for each low frequency band to be transmitted. These devices have been resorted to because the band width of even a coaxial cable is limited and because additional wire lines between widely separated terminals would cause a greater increase in cost than such devices.

There are many installations wherein the number of channels required for communication would not fully utilize the full frequency band width of the wire line. In addition, there are installations in which several lines are available, but these lines are not quite sufficient of themselves to handle added traffic loads. In these cases, a simple and inexpensive carrier system would provide sufficient traffic handling capacity at low cost as compared to the cost of adding further lines, even though the frequency spectrum is not used as efficiently as in the more expensive systems.

It is an object of this invention to provide a simple and inexpensive multiplex carrier system which will permit the economical use of carrier transmission over shorter distances than those heretofore considered economical. In accordance with the invention, the cost of the terminal equipments is reduced through a considerable reduction in the number of filters required. This reduction is obtained by:

(*i*) Suitable selection of the frequency of the carrier currents;

(*ii*) Transmission of both side bands of a modulated carrier channel with the carrier suppressed;

(*iii*) Increasing the frequency band width allotted to each channel;

(*iv*) Preventing the transmission over the line of signals in the modulated carrier band.

When the frequencies for the channel carriers are properly selected, objectionable modulation products of a group of channels may be eliminated by a single filter, and their separation will avoid the need for filtering each channel. Furthermore, by transmitting both side bands of the channel carrier, the use of side band filters also is avoided. Since the channel carrier side bands are not transmitted on the line, a single low pass filter rather than a band pass filter may be employed after the channel group modulator.

Figure 2:
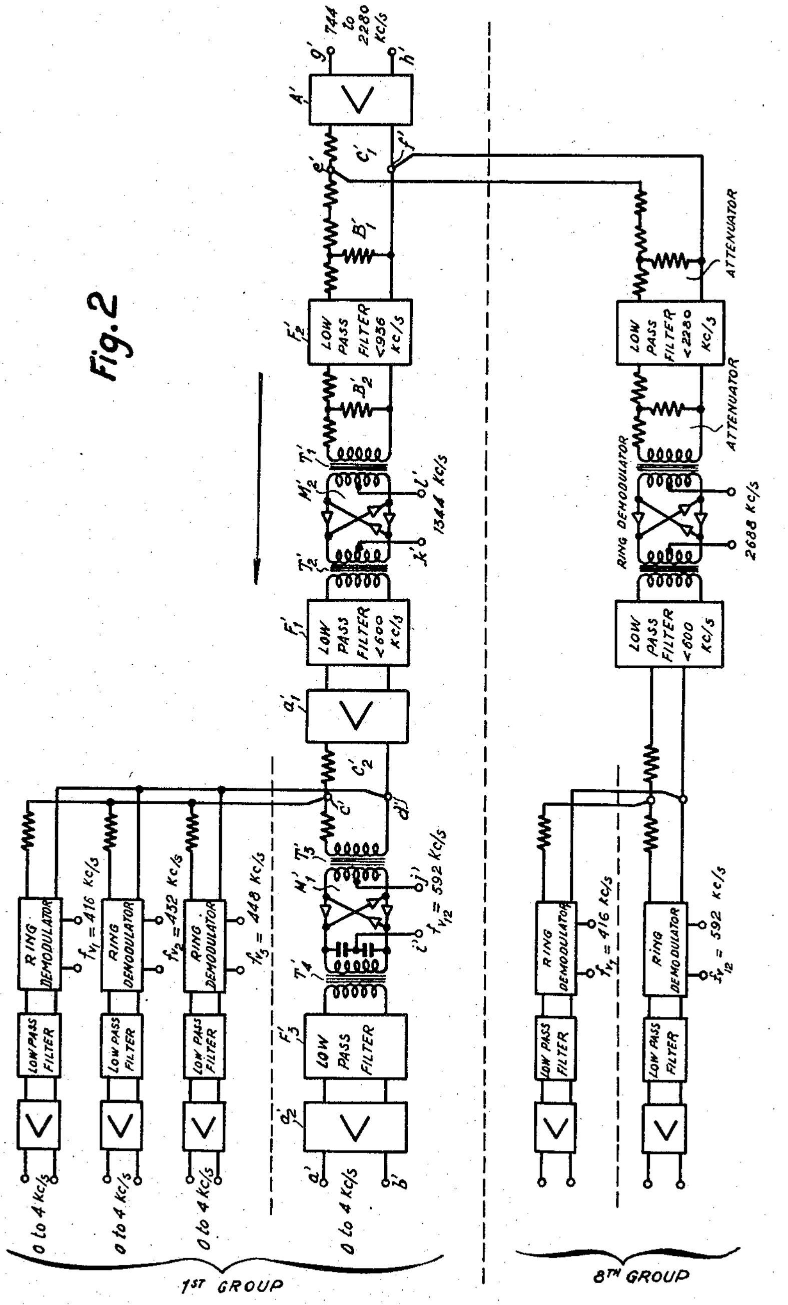

The invention may be better understood by reference to the following description and to the accompanying drawing, in which:

Fig. 1 shows a preferred embodiment of the transmitting terminal equipment of the invention; and Fig. 2 shows a preferred embodiment of the receiving terminal equipment of the invention.

In the embodiment shown in Fig. 1, it is assumed, for example, that it is desired to provide a system having a capacity of eight groups of twelve telephone channels each. The carrier frequency for each channel may be chosen as follows:

| | | |
|---|---|---|
| *fv*1—416 kc./s. | *fv*5—480 kc./s. | *fv*9—544 kc./s. |
| *fv*2—432 kc./s. | *fv*6—496 kc./s. | *fv*10—560 kc./s. |
| *fv*3—448 kc./s. | *fv*7—512 kc./s. | *fv*11—576 kc./s. |
| *fv*4—464 kc./s. | *fv*8—528 kc./s. | *fv*12—592 kc./s. |

With this selection of frequencies, each channel may have a band width of 16 kc./s., and the channels would occupy a band of frequencies from 408 kc. to 600 kc., a total of 192 kc.

Voice frequency signals are applied in each channel to terminals *a*, *b* and are fed to a modulator M1 through an attentuator B1 and to a transformer T1. The modulator M1, which is a well known type of bridge modulator, is also supplied at terminals *i*, *j* with carrier current at one of the frequencies within the range from 416 kc. to 592 kc. Because of the characteristics of the bridge modulator, the carrier current is suppressed in the output thereof.

The output of the modulator M1 is coupled to the terminals *c*, *d* by a transformer T2 and part of a coupling means C1. The other eleven channels are arranged the same as the channel shown and are similarly connected to terminals *c*, *d*.

Generally speaking, the highest voice frequency applied to the terminals *a*, *b* is 4 kc./s. and hence, all of the carrier side bands are within 4 kc./s. of the carrier frequency. Since the carriers are separated by 16 kc./s., there is 8 kc./s. between the lowest side band of one channel and the highest side band of the next adjacent channel, and hence, the signals in one channel do not disturb the signals in another channel. Also, all the desired signals lie within a band from 412 kc./s. to 596 kc./s. The closest undesired modulation product above 596 kc./s. is at the modulated second harmonic of 416 kc./s. or 832±4 kc./s. Therefore, a single low pass filter, as shown at F1, is sufficient to eliminate the undesired modulation products and to pass the desired modulation products.

Eight groups of twelve channels each are similarly formed, and each group is then modulated with a further carrier of suitable frequency. The group of channels passed by the filter F1 is, for example, supplied to the input of a modulator M2 by way of a transformer T3. The modulator M2 is also of the bridge type which suppresses the carrier frequency and is supplied at terminals K, I, with a carrier current in the frequency range from 1344 kc./s. to 2688 kc./s. The frequency of the carrier current supplied to one group modulator M2 differs from the frequency of the next carrier supplied to another group modulator by 192 kc./s.

The upper side band of each group carrier may also be eliminated by a low pass filter, such as a filter F2 coupled to the output of the modulator M2 by a transformer T4. After amplification at *a*1, *a*2, etc., the eight groups forming 96 channels are assembled at terminals *e*, *f* at the input of a general or line amplifier A, the output of which is connected at terminals *g*, *h* to the line extending between the carrier terminals.

It will be seen that the signals on the line due to the modulation of the carrier currents may occupy a frequency band from 744 kc./s. to 2280 kc./s. The group of channels modulated by the 1344 kc./s. carrier will have available the band from 744 kc./s. to 936 kc./s. while the next group with have from 936 kc./s. to 1128 kc./s. and so on up to the last group which will have from 2088 kc./s. to 2280 kc./s. The portion of the frequency spectrum from zero to 744 kc./s. will be unoccupied and in accordance with the invention, may be used for the transmission of the channel carriers. Transmission of the channel carriers to the receiver in this manner is the most reliable manner of synchronizing the phases of the channel carriers at the transmitter with the channel carriers at the receiver. Such synchronization, as is well known, is desirable to prevent distortion at the receiver when, as in this case, both side bands of the channel carriers are transmitted and the carriers themselves are suppressed. Also, added stability of the system is provided.

In Fig. 2, there is shown a preferred embodiment of the equipment which may be employed at a receiving terminal. In this equipment, the sequence of operations is the reverse of those at the transmitting terminal. The transmission line is connected to terminals *g'*—*h'* of a line amplifier A' which which amplifies the incoming signals. The output of the amplifier A' is connected at terminals *e'*—*f'* of coupling network C1' to eight group and channel demodulator chains, each comprising, for example, a low pass filter F2' which is identical with the filter F2 at the transmitting terminal, an attenuator B1' connected between the terminals *e'*—*f'* and the input of the filter F2' and a group demodulator M2' connected to the output of F2' by an attenuator B2' and a transformer T1'. Carrier current of the proper group frequency is supplied to terminals *k'*—*l'*, and the output of the demodulator M2' is fed to the input of a filter F1' through a transformer T2'.

The filter F1' which is identical to the transmitting filter F1 passes the signals in the range from 408 kc./s. to 600 kc./s. The signals from the filter F1' are amplified in an amplifier *a*1' and are fed to a coupling network C2'. Twelve channel demodulators, such as a demodulator M1' are connected to terminals *c'*—*d'* by transformers, such as transformer T3'. Suitable carrier current is supplied to terminals *i'*—*j'* of the demodulator M1', and the output of demodulator M1' is connected to a transformer T4' which also is connected to an elementary low pass filter F3' which passes signals in the frequency band from zero to 4 kc./s. An amplifier *a*2' connected to the output of the filter F3' distributes the voice currents at a suitable level.

The channel carrier currents which are transmitted over the line may be selected, phased and amplified in any well known manner at the receiving terminal and may be used at the channel demodulators M2.

The group carrier currents may be locally generated or they may be obtained by generating at the transmitting terminal a carrier current having a frequency of 192 kc./s. and transmitting this current over the line. At the receiving terminal, this 192 kc./s. current may be multiplied in frequency to produce the different carrier currents for group demodulation.

It will be seen, therefore, that the transmission of 96 channels in accordance with this invention requires only 84 high frequency filters for the two ends of the system instead of 800 high frequency filters normally required in certain prior art types of systems and instead of 416 high frequency filters required in other types of prior art systems using piezo-electric filters. Obviously, by observing the teachings of this application, identical results may be obtained with carrier frequencies different from those given specifically by way of example herein.

Furthermore, the system of this invention may be used in all transmission fields, such as the telephone, telegraph, and signaling fields, and similar fields, and, generally speaking, the invention may be used in connection with lines of any description.

If the large number of channels provided by this invention is not required and if it is desired to use instead only 12 channels, it is possible to transmit and receive only one group of channels. In this arrangement, only 4 filters would be necessary for transmitting and receiving the 12 channels.

What we claim is:

1. A system for multiplex transmission over a transmission medium comprising a plurality of sources of low frequency signals, a plurality of sources of first carrier signals, said carrier signals being separated in frequency by at least twice the highest frequency of the signals of one of said low frequency sources, means for modulating said carrier signals with said low frequency signals and for suppressing said carrier signals comprising a plurality of modulators, connected to said sources, a first low pass filter connected to said modulators and adapted to pass both side bands of said carrier signals and to reject signals as frequencies above the upper side band of the highest frequency carrier signal, a source of second carrier signals, means for modulating said second carrier signals with the side bands of said first carrier signals and for suppressing said second carrier signals comprising a modulator connected to said source of second carrier signals and to said filter, a second low pass filter connected to said modulator and adapted to pass one side band of said second carrier signals and reject the other side band of said second carrier signals and means for connecting said second filter to said transmission medium.

2. A system for multiplex transmission over a transmission medium comprising means for generating a plurality of modulated carrier signals spaced from each other by a frequency at least as great as the sum of the band widths of the adjacent side bands of two adjacent carrier signals, a filter connected to said generating means and adapted to pass said signals and to reject signals at frequencies above the upper band of the carrier having the highest frequency, a source of second carrier signals, means for modulating said second carrier signals with said modulated carrier signals and for transmitting one side band of said second carrier signals comprising a modulator connected to said source and to said filter and a further filter connected to said modulator and adapted to pass one side band of said second carrier and to reject signals at frequencies on the side of said second carrier opposite from said one side band, and means for coupling said further filter to said transmission medium.

3. A system for multiplex transmission over a transmission medium comprising a plurality of sources of low frequency signals, a plurality of sources of first carrier signals, said carrier signals being separated in frequency by at least twice the highest frequency of the signals of one of said low frequency sources, and the carrier signal having the highest frequency being lower in frequency than twice the frequency of the carrier signals having the lowest frequency, means for modulating said carrier signals with said low frequency signals and for suppressing said carrier signals comprising a plurality of modulators, connected to said sources, a first low pass filter connected to said modulators and adapted to pass both side bands of said carrier signals and to reject signals at frequencies above the upper side band of the highest frequency carrier signal, a source of second carrier signals, means for modulating said second carrier signals with the side bands of said first carrier signals and for suppressing said second carrier signals comprising a modulator connected to said source of second carrier signals and to said filter, a second low pass filter connected to said modulator and adapted to pass one side band of said second carrier signals and reject the other side band of said second carrier signals and means for connecting said second filter to said transmission medium.

4. A system for multiplex transmission over a transmission line comprising a plurality of sources of low frequency signals, means for converting said signals into signals within first predetermined higher frequency side bands comprising a plurality of sources of first carrier frequency signals, said carrier signals being spaced in frequency by a frequency at least as great as a pair of said side bands and the carrier signals of highest frequency being lower in frequency than twice the frequency of the carrier signals of lowest frequency, and a plurality of modulators connected to said sources, a single low pass filter connected to said modulators and adapted to pass signals in all side bands of the fundamental frequencies of said carrier signals and to reject higher frequency signals, means for converting the signals in said side bands into signals within second predetermined side bands having frequency ranges above the frequency of said carrier signals of highest frequency, said last-mentioned converting means comprising a source of second carrier signals and a further modulator connected to said second carrier source and to said filter, a second low pass filter connected to said last-mentioned converting means and adapted to pass the lower side bands of said second carrier signals and to reject higher frequency signals and means for coupling said second filter to said transmission line.

5. A system for multiplex transmission over a transmission line comprising a plurality of sources of low frequency signals, means for converting said signals into signals within first predetermined higher frequency side bands comprising a plurality of sources of first carrier frequency signals, said carrier signals being spaced in frequency by a frequency at least as great as a pair of said side bands and the carrier signals of highest frequency being lower in frequency than twice the frequency of the carrier signals of lowest frequency, and a plurality of modulators connected to said sources, a single low pass filter connected to said modulators and adapted to pass signals in all side bands of the fundamental frequencies of said carrier signals and to reject higher frequency signals, means for converting the signals in said side bands into signals within second predetermined side bands having frequency ranges above the frequency of said carrier signals of highest frequency, said last-mentioned converting means comprising a source of second carrier signals and a further modulator connected to said second carrier source and to said filter, a second low pass filter connected to said last-mentioned converting means and adapted to pass the lower side bands of said second carrier signals and to reject higher frequency signals, means for coupling said second filter to said transmission line and means for coupling said sources of first carrier frequency signals to said transmission line.

6. Means for receiving a plurality of carrier signals transmitted over a transmission medium comprising a low pass filter, means for coupling said filter to said medium for selecting predetermined ones of said carrier signals, means connected to said filter means for converting said signals into signals having a different frequency, a low pass filter connected to said converting means and adapted to pass a portion of said different frequency signals, and further means connected to said low pass filter for converting a portion of said different frequency signals into low frequency signals.

7. A system for multiplex transmission over a transmission medium comprising a plurality of means for generating modulated carrier signals including pairs of side band signals, a low pass filter connected to each of said means and adapted to pass said side band signals, means connected to said filter for converting said side band signals into upper and lower side band signals of a different frequency, a second low pass filter connected to said converting means and adapted to pass said lower side band signals and to reject higher frequency signals and means for coupling said second low pass filter to said transmission medium.

8. A system for multiplex communication over a transmission medium comprising a plurality of means for generating modulated carrier signals including pairs of side band signals, a low pass filter connected to each of said means and adapted to pass said side band signals, means connected to said filter for converting said side band signals into upper and lower side band siganls of a different frequency, a second low pass filter connected to said converting means and adapted to pass said lower side band signals and to reject higher frequency signals, means for coupling said second low pass filter to said transmission medium, and means for receiving said lower side band signals comprising a third low pass filter, means for coupling said third low pass filter to said medium for selecting predetermined ones of said lower side band signals, means connected to said third low pass filter for converting said predetermined ones of said lower side band signals into signals having a different frequency, a fourth low pass filter connected to said last-mentioned converting means and adapted to pass a portion of said different frequency signals and further means connected to said fourth low pass filter for converting a portion of said different frequency signals into low frequency signals.

PIERRE MARZIN.
RENÉ SUEUR.

REFERENCES CITED

The following references are of record in the file of this patent:

UNITED STATES PATENTS

| Number | Name | Date |
|---|---|---|
| 1,910,977 | Weis | May 23, 1933 |

FOREIGN PATENTS

| Number | Country | Date |
|---|---|---|
| 878,209 | France | Sept. 28, 1942 |